United States Patent Office 3,226,419
Patented Dec. 28, 1965

3,226,419
SUBSTITUTED β-ALKYL AND β-CYCLOALKYL-AMINOPROPIONAMIDES
Harold Elmer Zaugg, Lake Forest, Robert William De Net, Waukegan, and Raymond John Michaels, Jr., Mundelein, Ill., assignors to Abbott Laboratories, North Chicago, Ill., a corporation of Illinois
No Drawing. Filed Dec. 18, 1963, Ser. No. 331,366
4 Claims. (Cl. 260—463)

This is a continuation-in-part of our application Serial No 235,541, now abandoned, filed November 5, 1962.

This invention relates to novel compounds of the formula

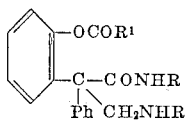

and acid-addition salts thereof as well as methods for their preparation. In this and succeeding formulas, each R is cycloalkyl containing from 3 to 6 carbon atoms inclusive, or loweralkyl containing from 1 to 4 carbon atoms inclusive, Ph is phenyl and R¹ is loweralkyl or loweralkoxy containing from 1 to 4 carbon atoms inclusive. These compounds can be isolated as the free bases or more conveniently as solid, crystalline salts by reaction of the free base with hydrogen chloride, hydrogen bromide, oxalic acid, benzoic acid or other inorganic and organic acids in a suitable solvent medium such as ether. The free bases per se or their therapeutically acceptable acid-addition salts are useful as analgesics when administered to animals orally or intravenously alone or admixed with a conventional, non-toxic, liquid or solid carrier. In a typical application, it was found that when a tablet containing 50 mg. of N-cyclohexyl-β-cyclohexyl-amino - α - (o-acetoxyphenyl)-α-phenylpropionamide was given orally to mice, the threshold time to the pain provoking stimulus was markedly increased.

The compounds are readily prepared by the reaction of equimolecular proportions of a compound of the formula

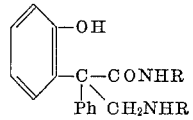

and a compound of the group consisting of acetyl chloride, propionyl chloride, butyryl chloride, valeryl chloride, methyl chloroformate, ethyl chloroformate, propyl chloroformate or butyl chloroformate in an inert, organic solvent such as benzene, ether, tetrahydrofuran, cyclohexane, acetonitrile or 1,2-dimethoxyethane in the presence or absence of a hydrohalide acceptor at a temperature of from 20° C. to the reflux temperature of the reaction mixture. When the reaction is complete, the precipitate which forms is removed and the filtrate concentrated to obtain the desired product as the free base which if desired can be converted to an acid-addition salt in a conventional manner.

The following examples illustrate rather than limit the invention.

EXAMPLE 1

N-cyclohexyl-β-cyclohexylamino-α-(o-acetoxyphenyl)-α-phenylpropionamide

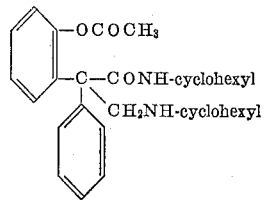

To a solution of 8.4 grams (0.02 mole) of N-cyclohexyl - β-cyclohexylamino-α-(o-hydroxyphenyl)-α-phenylpropionamide (M.P.=147° C.) in 100 ml. of 1,2-dimethoxyethane containing 4.0 grams (0.04 mole) of triethylamine was added dropwise with stirring over a period of 5 minutes, 1.6 grams (0.02 mole) of acetyl chloride dissolved in 10 ml. of 1,2-dimethoxyethane. The mixture was stirred at room temperature for 6 hours, refluxed for one hour and then allowed to stand overnight at room temperature. The precipitate which formed was removed by filtration and the filtrate was concentrated under reduced pressure to obtain the desired product as an oil which was immediately converted to the HCl salt by treatment with ethereal hydrogen chloride. After recrystallization from acetone, the solid hydrochloride melted at 210° C. and contained 5.58% nitrogen compared to the calculated value of 5.61% nitrogen. The yield was 80% of theory.

EXAMPLE 2

By substituting propionyl chloride for the acetyl chloride in the procedure of Example 1, there is obtained a 53% yield of N-cyclohexyl-β-cyclohexylamino-α-(o-propionoxyphenyl) - α - phenylpropionamide hydrochloride melting at 191° C.

In like manner, the substitution of butyryl chloride or valeryl chloride for the acetyl chloride of Example 1 will result in the formation, respectively, of N-cyclohexyl-β-cyclohexylamino-α-(o-butyroxyphenyl)-α-phenyl-propionamide and N-cyclohexyl-β-cyclohexylamino-α-(o-valeroxyphenyl)-α-phenylpropionamide which can be readily converted to solid HBr salts by reaction with ethereal hydrogen bromide.

EXAMPLE 3

The reaction of N-cyclopropyl-β-cyclopropylamino-α-(o-hydroxyphenyl)-α-phenylpropionamide (M.P.=190° C.) with ethyl chloroformate according to the foregoing procedure results in the formation of N-cyclopropyl-β-cyclopropylamino - α - (o-ethoxycarbonyloxy)-α-phenylpropionamide hydrochloride having a melting point of 178° C.

Similarly, the replacement of ethyl chloroformate in the reaction above with methyl chloroformate, propyl chloroformate or butyl chloroformate will form compounds wherein R¹ of the general formula is methoxy, propoxy or butoxy and each R is cyclopropyl. By replacing ethyl chloroformate with acetyl chloride, propionyl chloride, butyryl chloride or valeryl chloride one obtains the compounds wherein R¹ of the general formula is methyl, ethyl, propyl or butyl and each R is cyclopropyl, respectively.

EXAMPLE 4

The reaction of N-n-propyl-β-n-propylamino-α-(o-hydroxyphenyl)-α-phenylpropionamide (M.P.=144° C.) with acetyl chloride, propionyl chloride, butyryl chloride, valeryl chloride, methyl chloroformate, ethyl chloroformate, propyl chloroformate or butyl chloroformate according to the procedure previously described will form compounds wherein each R of the general formula is n-propyl and $R^1$ is methyl, ethyl, propyl, butyl, methoxy, ethoxy, propoxy and butoxy, respectively.

The substitution in the preceding reaction of other phenylpropionamides such as N-n-butyl-β-n-butylamino-α-(o-hydroxyphenyl)-α-phenylpropionamide (M.P.=119° C.), N-cyclobutyl-β-cyclobutylamino-α-(o-hydroxyphenyl)-α-phenylpropionamide (M.P.=165° C.) or N-cyclopentyl-β-cyclopentylamino-α-(o - hydroxyphenyl)-α-phenylpropionamide (M.P.=147° C.) will form compounds wherein each R of the general formula is n-butyl, cyclobutyl or cyclopentyl, respectively, and $R^1$ is as indicated above.

The N - alkyl-α,α-diaryl-β-alkylamino-propionamides employed as one of the reactants in the present invention can be prepared by reacting at room temperature one molecular proportion of 3-bromomethyl-3-phenyl-2-benzofuranone (M.P.=130° C.) and three molecular proportions of an alkylamine or cycloalkylamine in an inert solvent such as benzene. When the reaction is complete, the precipiate which forms is separated, treated with water and the water insoluble material is recovered from the aqueous mixture to obtain the desired product.

We claim:
1. A member of the group consisting of a compound of the formula

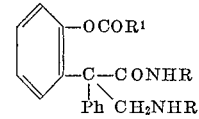

and therapeutically acceptable, acid-addition salts thereof wherein Ph is phenyl, each R is a member of the group consisting of loweralkyl of from 1 to 4 carbon atoms and cycloalkyl of from 3 to 6 carbon atoms, and $R^1$ is a member of the group consisting of loweralkyl of from 1 to 4 carbon atoms and loweralkoxy of from 1 to 4 carbon atoms.

2. N-cyclohexyl-β-cyclohexylamino-α-(o-acetoxplyhenyl)-α-phenylpropionamide.

3. N - cycloxyl-β-cyclohexylamino-α-(o - propionoxyphenyl)-α-phenylpropionamide hydrochloride.

4. N - cyclopropyl-β-cyclopropylamino-α-(o - ethoxycarbonyloxyphenyl) - α - phenylpropionamide hydrochloride..

No References cited.

CHARLES B. PARKER, *Primary Examiner.*

FLOYD D. HIGEL, *Assistant Examiner.*